United States Patent
Usami et al.

(10) Patent No.: US 8,426,054 B2
(45) Date of Patent: Apr. 23, 2013

(54) LAMINATED POROUS FILM AND SEPARATOR FOR CELL

(75) Inventors: Yasushi Usami, Nagahama (JP); Takeyoshi Yamada, Shiga (JP); Jun Takagi, Shiga (JP)

(73) Assignee: Mitsubishi Plastics, Inc., Tokyo (JP)

( * ) Notice: Subject to any disclaimer, the term of this patent is extended or adjusted under 35 U.S.C. 154(b) by 0 days.

(21) Appl. No.: 12/598,903

(22) PCT Filed: May 7, 2008

(86) PCT No.: PCT/JP2008/001151
§ 371 (c)(1),
(2), (4) Date: Nov. 4, 2009

(87) PCT Pub. No.: WO2008/139727
PCT Pub. Date: Nov. 20, 2008

(65) Prior Publication Data
US 2010/0151311 A1 Jun. 17, 2010

(30) Foreign Application Priority Data
May 7, 2007 (JP) .............................. 2007-122026

(51) Int. Cl.
*H01M 2/14* (2006.01)
*B32B 5/18* (2006.01)
*B32B 5/02* (2006.01)

(52) U.S. Cl.
USPC ........................... 429/145; 442/334; 428/220

(58) Field of Classification Search .................. 429/145; 442/334; 428/220
See application file for complete search history.

(56) References Cited

U.S. PATENT DOCUMENTS 5,922,492 A * 7/1999 Takita et al. .................. 429/249
2002/0055036 A1 * 5/2002 Shinohara et al. .............. 429/62
2005/0255769 A1 11/2005 Henninge et al.
2006/0019154 A1 * 1/2006 Imachi et al. .................. 429/144
2009/0148762 A1 * 6/2009 Kasamatsu et al. ........... 429/145

FOREIGN PATENT DOCUMENTS

| EP | 0 336 170 | 10/1989 |
|---|---|---|
| EP | 1 538 686 | 6/2005 |
| JP | 2883726 B2 | 6/1992 |
| JP | 3050021 B2 | 1/1995 |
| JP | 2002-249966 A | 9/2002 |
| JP | 2005-019026 A | 1/2005 |
| JP | 2006-092829 A | 4/2006 |
| JP | 2006-264029 A | 10/2006 |
| JP | 2007-059388 | 3/2007 |
| JP | 2007-160694 A | 6/2007 |
| JP | 2007-238822 A | 9/2007 |

OTHER PUBLICATIONS

Supplementary European Search Report issued Nov. 2, 2011, in related European Application No. 08751675.3 (PCT/JP2008/001151).
U.S. Appl. No. 13/378,107, filed Dec. 14, 2011, Yamada, et al.
U.S. Appl. No. 13/635,506, filed Sep. 17, 2012, Yamada, et al.
U.S. Appl. No. 13/635,764, filed Sep. 18, 2012, Yamamoto, et al.
U.S. Appl. No. 13/582,659, filed Sep. 4, 2012, Yamamoto, et, al.

* cited by examiner

*Primary Examiner* — Karie O'Neill Apicella
(74) *Attorney, Agent, or Firm* — Oblon, Spivak, McClelland, Maier & Neustadt, L.L.P.

(57) ABSTRACT

A laminated porous film having a shutdown (SD) property and a high breakdown (BD) property combined includes at least two layers, which are a porous membrane layer (A layer) having a thickness of 10 μm or greater other than non-woven fabric and a non-woven fabric layer (B layer) having a fiber diameter of 1 μm or less. A value of the ratio (AP1/AP2) between air permeability when heating at a heating temperature of 150° C. to 200° C. for three minutes (AP1) and air permeability prior to heating (AP2) is 10 or greater at any heating temperature between 150° C. and 200° C.

17 Claims, No Drawings

LAMINATED POROUS FILM AND SEPARATOR FOR CELL

CROSS REFERENCE TO RELATED APPLICATIONS

This is the U.S. national phase application under 35 U.S.C. §371 of International Patent Application No. PCT/JP2008/001151, filed May 7, 2008, which claims the benefit of Japanese Application No. 2007-122026, filed May 7, 2007. The International Application was published on Nov. 6, 2008 as International Publication No. WO/2008/139727 published in Japanese language under PCT Article 21(2). The contents of these applications are incorporated herein in their entirety.

FIELD OF THE INVENTION

The present invention relates to a laminated porous film that can be employed for packaging use, sanitary use, animal industry use, agricultural use, architectural use, medical use, separatory membrane, light diffuser plate and battery separator use, and the like. In particular, it relates to a laminated porous film that can be employed suitably as a separator for non-aqueous electrolyte secondary battery.

BACKGROUND OF THE INVENTION

Secondary batteries are widely used as power sources of portable electronic devices such as for OA (office automation), FA (factory automation), household appliances, communication devices and the like. In particular, since the volume efficiency improves when a device is equipped with a lithium ion secondary battery, leading to a decrease in the size and weight of the instrument, portable devices using lithium ion secondary battery are on the rise.

Meanwhile, regarding large secondary batteries, the use of large secondary batteries is under research and development in a number of fields related to environmental issues, such as load leveling, UPS (uninterruptible power supply) and electric car to begin with. Among them, since lithium ion secondary batteries, which are one type of non-aqueous electrolyte secondary battery, have large capacity, high output, high voltage, excellent long term conservation ability and the like, research and development in particular are proceeding in a number of fields.

A separator used in a non-aqueous electrolyte secondary battery, for instance, a lithium ion secondary battery, is a member bearing the role, by being inserted between the positive electrode and the negative electrode, of preventing a short circuit that accompanies a contact between the active materials of both electrodes, and at the same time, of retaining the electrolytic solution to secure electric conductivity. Therefore, in addition to the necessity of being provided with insulation property and a porous structure, a separator used in this type of battery needs to be provided with permeability to air to secure passage of lithium ions; from such necessities, porous films are used in general.

Regarding porous film used in the separator of a non-aqueous electrolyte secondary battery, a producing method for a laminated film of polyethylene and polypropylene has been proposed, for instance, in Japanese Patent Publication No. 2883726, which is hereby incorporated by reference herein in its entirety. The characteristics of this porous film producing method reside on the point of controlling a higher order structure with a high draft rate when the raw sheet is fabricated, and the point of multiple-stage drawing at small ratios at low temperature and high temperature.

In addition, a composite sheet is proposed in Japanese Patent Application Laid-open No. 2006-264029, which is hereby incorporated by reference herein in its entirety, in which two or more layers of thermoplastic polymer porous sheet having a melting point of 200° C. or lower and non-woven fabric sheet having no substantially stable melting point are layered.

In addition, the use of a microfibrous polymer web (non-woven fabric) produced by accumulating a fiber spun over a collector by the electrospinning method is disclosed in Japanese Patent Application Laid-open No. 2002-249966, which is hereby incorporated by reference herein in its entirety, as a separator for lithium secondary battery. Then, from the point of view of improving the strength thereof, the use of a non-woven fabric made of polyimide resin, in which the diameter of the fiber produced by the electrospinning method is 1 μm or less, is proposed in Japanese Patent Application Laid-open No. 2005-019026, which is hereby incorporated by reference herein in its entirety, as a battery separator.

In addition, a separator for lithium ion secondary battery is proposed in Japanese Patent Application Laid-open No. 2006-092829, which is hereby incorporated by reference herein in its entirety, in which a non-woven fabric obtained by the electrospinning method is layered over both sides of a woven sheet surface.

With the recent increase in the capacities of batteries, the importance regarding safety of batteries is increasing. The shutdown property (hereinafter, also referred to as "SD property") may be cited as a property of a battery separator contributing to safety. This SD property is a property whereby the micropores of the separator become occluded when a temperature is high (130 to 150° C.), resulting the ion conduction within the battery to become blocked, preventing an increase in temperature subsequently inside the battery. In case a porous film is to be used as a battery separator, it needs to be a porous film provided with this SD property.

The breakdown property (hereinafter referred to as "BD property") may be cited as another property contributing to safety. This BD property is a property demonstrating the heat resistance of the separator, which, while retaining the SD property (that is to say, by retaining the state in which the micropores of the separator are occluded) at a temperature where the SD property is expressed or higher, maintains the shape of the separator up to a higher temperature (150° C. or higher) state, separating the positive electrode and the negative electrode. In case a porous film is to be used as a battery separator, providing this BD property is also important from the point of view of securing safety.

However, regarding existing separators using non-woven fabric, attention to such SD property and BD property was not sufficient. For instance, although the use of porous non-woven fabric as a separator for secondary battery is described in the aforementioned Patent References 3 to 5, no consideration whatsoever is made regarding the SD property and the BD property, which is not sufficient to secure the safety of the battery.

SUMMARY OF THE INVENTION

The present invention relates to a laminated porous film provided with a non-woven fabric layer that exhibits excellent SD and BD properties when used as a battery separator, and in particular, as a separator for non-aqueous electrolyte secondary battery.

The present inventors propose a laminated porous film, which is a laminated porous film provided with at least two layers, which are a porous membrane layer (A layer) having a thickness of 10 μm or greater and a non-woven fabric layer (B layer) having a fiber diameter of 1 μm or less, in which the value of the ratio (AP1/AP2) between air permeability when heating at a heating temperature of 150° C. to 200° C. for three minutes (AP1) and air permeability prior to heating (AP2) is 10 or greater at any heating temperature between 150° C. and 200° C., in a heat test in which a film is placed for a predetermined time (heating time) inside an oven heated at a predetermined temperature (heating temperature) to measure air permeability of the film prior to heating (AP2) and air permeability of the film after heating (AP1).

EFFECTS OF THE INVENTION

The laminated porous film of the present invention can be employed, for instance, for packaging use, sanitary use, animal industry use, agricultural use, architectural use, medical use, separatory membrane, light diffuser plate and battery use. In addition, since the laminated porous film of the present invention is provided with excellent SD property and BD property it can be used suitably as a battery separator, and particularly as a separator for non-aqueous electrolyte secondary battery.

Here, excellent SD property means that once SD property has been expressed, occluding the micropores of the separator, the SD property continues to be retained up to a temperature at which BD property may be exerted (preferably 200° C.).

DETAILED DESCRIPTION OF THE INVENTION

Hereinafter, a laminated porous film (hereinafter referred to as "the present laminated porous film") according to one example of embodiment of the present invention (hereinafter referred to as "the present embodiment") will be described in detail. However, the present invention is not limited to the present embodiment described below, but only according to the scope of the claims and their equivalents.

[Laminated Porous Film]

The present laminated porous film is provided with a constitution comprising a porous membrane layer which is other than a non-woven fabric having a thickness of 10 μm or greater (A layer) and a non-woven fabric layer having a fiber diameter of 1 μm or less (B layer), which are layered. In such a layered constitution, it is desirable that the porous membrane layer (A layer) has the functional share of SD property and the non-woven fabric layer (B layer) has the functional share of BD property when the present laminated porous film is used as a battery separator.

[Porous Membrane Layer (A Layer)]

First, the porous membrane layer (A layer) will be described.

<Thermoplastic Resin (a)>

The porous membrane layer (A layer) is a layer containing thermoplastic resin (a) as main constituent. In other words, the porous membrane layer (A layer) can be formed from a resin composition having thermoplastic resin (a) as main constituent.

For the thermoplastic resin (a) constituting the main constituent of the porous membrane layer (A layer), the thermal property thereof is important. Concretely, those having a peak value of the crystal melting temperature (also referred to as the "crystal melting peak temperature") in a temperature range of 100 to 150° C. are preferred, and in particular, those having the peak value in a temperature range of 100 to 145° C., and among them, in a temperature range of 100 to 140° C., are preferred.

This peak value of crystal melting temperature is the peak value of DSC crystal melting temperature collected according to JIS K7121 (ISO 3146) using a differential scanning type calorimeter (DSC-7) manufactured by Perkin-Elmer at a temperature increase speed of 10° C./minute.

As long as the above condition of crystal melting temperature peak value is fulfilled, the thermoplastic resin (a), which is the main constituent of the porous membrane layer (A layer), does not limit the type of resin in particular. However, when the use of the present laminated porous film as a battery separator is intended, one species, or a mixed resin comprising a combination of two species or more, among polyolefin series resins such as low density polyethylene, high density polyethylene, linear low density polyethylene, ethylene vinyl acetate copolymer, polypropylene and polymethyl pentene is desirable from the point of view of chemical resistance property, or the like, of the A layer.

As necessary, another thermoplastic resin may be mixed with the said thermoplastic resin (a) with a range within which the SD property is not lost.

As thermoplastic resin to be mixed with the said thermoplastic resin (a), one species or a mixed resin comprising a combination of two species or more among styrene series resins such as polystyrene, AS resin, ABS resin and PMMA resin, polyvinyl chloride, fluorine series resins, ester series resins such as polyethylene terephthalate, polybutylene terephthalate, polycarbonate and polyarylate, ether series resins such as polyacetal, polyphenylene ether, polysulfone, polyether sulfone, polyether etherketone and polyphenylene sulfide, polyamide series resins such as 6 nylon, 6-6 nylon and 6-12 nylon, and the like, can be cited.

In addition, as necessary, a component called rubber constituent, such as thermoplastic elastomer, may be added to the said thermoplastic resin (a) with a range within which SD property is not lost.

As the thermoplastic elastomer, one species or a mixture comprising a combination of two species or more among styrene-butadiene series, polyolefin series, urethane series, polyester series, polyamide series, 1,2-polybutadiene, polyvinyl chloride series, ionomer and the like, can be cited.

<Filler>

In addition to the thermoplastic resin (a), it is desirable that the porous membrane layer (A layer) contains a filler. In other words, it is desirable that the resin composition having thermoplastic resin (a) as main constituent contains a filler. The reason for this is, as described below, methods for forming porous membrane using a filler are desirable environmentally and for producing efficiency.

As fillers, inorganic fillers and organic fillers may be cited.

As example of inorganic filler, one species or a mixture comprising a combination of two species or more among carbonates such as calcium carbonate, magnesium carbonate and barium carbonate, sulfates such as calcium sulfate, magnesium sulfate and barium sulfate, chlorides such as sodium chloride, calcium chloride and magnesium chloride, oxides such as aluminum oxide, calcium oxide, magnesium oxide, zinc oxide, titanium oxide and silica, in addition to silicates such as talc, clay and mica, and the like, can be cited.

Among these, barium sulfate is preferred from the point of view that solubility with respect to the electrolytic solution is low when the present laminated porous film is used as a battery separator.

So that the filler does not melt at drawing temperatures, resin particles having higher crystal melting peak temperatures than the crystal melting peak temperature of the thermoplastic resin (a) are desirable as organic fillers. Among them, resin particles that have been crosslinked so as to have a gel fraction on the order of 4 to 10% are more desirable.

As examples of organic filler, one species or a mixture comprising a combination of two species or more among thermoplastic resins and thermosetting resins such as ultra high molecular weight polyethylene, polystyrene, polymethyl metacrylate, polycarbonate, polyethylene terephthalate, polybutylene terephthalate, polyphenylene sulfide, polysulfone, polyether sulfone, polyether etherketone, polytetrafluoroethylene, polyimide, polyether imide, melamine and benzoguanamine can be cited. Among these, crosslinked polystyrenes are particularly desirable.

When the above fillers are adopted to form the porous membrane layer (A layer), both inorganic filler and organic filler may be used as long as the effects that express the porous structure are not lost. However, inorganic filler is more desirable from the point of view of heat resistance or the like.

As average particle size of the filler, 0.1 µm or greater is desirable, 0.3 µm or greater is more desirable and 0.5 µm or greater is even more desirable. As the upper limit value, 50 µm or less is desirable, 10 µm or less is more desirable and 5 µm or less is even more desirable. It is desirable if the average particle size of the filler is 0.1 µm or greater on the point that a film in which the filler has been dispersed uniformly can be drawn uniformly, readily allowing it to become porous. On the other hand, it is desirable if the average particle size is 50 µm or less, since the decrease in mechanical strength of the film that accompanies filling with the filler can be suppressed.

It is desirable that the amount of filler is 50 parts in mass or greater with respect to 100 parts in mass of the thermoplastic resin (a), which is a main constituent of the porous membrane layer (A layer). As the upper limit value, 400 parts in mass or less is desirable and 300 parts in mass or less is more desirable. It is desirable if the amount of filler is the above 50 parts in mass or greater since the targeted suitable porous structure is expressed more readily. In addition, it is desirable if the amount of filler is the 400 parts in mass or less since stable forming process is possible without causing processing troubles such as the resin burning at forming.

<Plasticizer>

In addition, in order to increase the dispersion of the filler in the thermoplastic resin (a), a plasticizer may be added. However, it is also possible to form the porous membrane layer (A layer) without adding a plasticizer.

As plasticizers usable in the present embodiment, ester compound, amide compound, alcohol compound, amine compound, epoxide compound, ether compound, sulfone compound, mineral oil, paraffin wax, liquid silicone, fluorine oil, liquid polyethers, liquid polybutenes, liquid polybutadienes, carboxylate, sulfonate, amine salt, carboxylic acid compound, fluorine series compound and the like can be cited.

More concretely, ethylene bis-stearic acid amide, hexamethylene bis-stearic acid amide and the like as amide compounds, tetraglycerin tristearate glycerin tristearate, stearyl stearylate, ethylene carbonate, distearyl carbonate, dioctylnaphthalate and the like as ester compounds, and stearyl alcohol, oleyl alcohol, dodecylphenol and the like as alcohols, may be used.

In addition, dihydroxyethylstearylamine, lauryl amine and the like may be used as amine compounds, stearyl dimethyl betaine, lauryl trimethyl ammonium chloride and the like may be used as amine salt compounds, epoxy soybean oil and the like may be used as epoxy compounds, triethylene glycol and the like may be used as ether compounds, kerosene, naphthenic oil and the like may be used as mineral oils, paraffin wax and the like may be used as synthetic waxes, calcium stearate, sodium oleate and the like may be used as carboxylates, stearic acid, caproic acid and the like may be used as carboxylic acids, sodium dodecylbenzene sulfonate and the like may be used as sulfonates, and sulfolane, dipropylsulfone and the like may be used as compounds having sulfone bonds.

Among the plasticizers that have been enumerated above, given the applications using the present laminated porous film as a battery separator, plasticizers having a melting point of 25° C. or higher, and among them, plasticizers having a boiling point of 140° C. or higher are desirable.

Here, a "melting point of 25° C. or higher" is defined as a case when the crystal melting peak temperature is measured by DSC (differential scanning calorimetry), the crystal melting peak temperature demonstrates clearly 25° C. or higher, or, a case where the kinematic viscosity at 25° C. is 100000 mm$^2$/second or greater.

A "boiling point of 140° C. or higher" is defined as a case where the boiling point is clearly 140° C. or higher, or a case where the mass after heating for one hour at 140° C. with respect to the mass prior to heating does not decrease by 10% or greater.

An amount of plasticizer with respect to 100 parts in mass of resin composition as total forming raw material forming the porous membrane layer (A layer) of 0.1 parts in mass or greater is desirable, more desirable is 0.3 parts in mass or greater, and further desirable is 0.5 parts in mass or greater. On the other hand, 30 parts in mass or less is desirable, more desirable is 20 parts in mass or less, and further desirable is 10 parts in mass or less. It is desirable if the amount of plasticizer is 0.1 parts in mass or greater, since the targeted suitable drawing property can be expressed, leading to a uniform porous structure being obtained more readily. In addition, it is desirable if the amount of plasticizer is 30 parts in mass or less, since occurrence of processing troubles such as resin burning and gumming during film forming will be difficult.

Note that an additive generally mixed with a resin composition, for instance, an oxidation inhibitor, an ultraviolet light absorbent and the like, may be mixed with the porous membrane layer (A layer), in other words, with the resin composition serving as a raw material for forming the porous membrane layer (A layer).

<Porosity>

It is desirable that the porosity of the porous membrane layer (A layer) is 10% or greater, particularly 20% or greater, of which particularly 30% or greater. If 10% or greater, since air permeability can be secured by securing continuity to some extent (that is to say, since air permeability can be numerically small), for instance, when the use is as a battery separator, the electric resistance can be low, which is more suitable for use as a separator. On the other hand, regarding the upper limit, it is 90% or less, preferably 80% or less and more preferably 70% or less. If porosity is 90% or less, since strength can be secured to some extent at the same time as, for instance when the use is as a battery separator, the shutdown function can be secured even if the thickness is thin, a suitable use as a separator is possible.

<Average Pore Diameter>

Regarding the average pore diameter of the porous membrane layer (A layer), it is desirable that it is 0.001 µm or greater, particularly 0.005 µm or greater, of which particularly 0.01 µm or greater. If the average pore diameter of the porous membrane layer (A layer) is 0.001 µm or greater, since air permeability can be secured by securing continuity to some extent (that is to say, since air permeability can be numerically small), for instance when the use is as a battery separator, the electric resistance can be low, which is suitable for a use as a separator. On the other hand, regarding the upper limit, it is 1 µm or less, preferably 0.5 µm or less and more preferably 0.1 µm or less. If the average pore diameter is 1 µm or less, since strength can be secured to some extent at the same time as, for instance when the use is as a battery separator, the shutdown function can be secured even if the thickness is thin, a suitable use as a separator is possible.

Note that the average pore diameter of the porous membrane layer (A layer) can be measured using for instance a porometer device manufactured by Coulter Inc.

<Air Permeability>

It is desirable that the air permeability of the porous membrane layer (A layer) is 5000 sec/100 ml or less, particularly 1000 sec/100 ml or less, of which particularly 500 sec/100 ml or less. If the air permeability of the porous membrane layer (A layer) is 5000 sec/100 ml or less, since air permeability can be secured by securing continuity to some extent (that is to say, since air permeability can be numerically small), for instance when the use is as a battery separator, if air permeability is 1000 sec/100 ml or less, the electric resistance can be low, which is suitable for a use as a separator.

On the other hand, regarding the lower limit, 10 sec/100 ml or greater, particularly 15 sec/100 ml or greater, of which particularly 20 sec/100 ml or greater is desirable. If the air permeability of the porous membrane layer (A layer) is 10 sec/100 ml or greater, electrical insulation can be secured.

[Non-Woven Fabric Layer (B Layer)]

In the following, the non-woven fabric layer (B layer) will be described.

<Fiber Diameter>

The non-woven fabric layer (B layer) is a non-woven fabric layer with a fiber diameter of 1 µm or less. With a fiber diameter of 1 µm or less, the thickness of the non-woven fabric layer (B layer) can be thin, and furthermore extremely finely meshed and dense non-woven fabric can be fabricated, which is thus desirable. Concomitantly, as far as the present laminated porous film is concerned, uniformity can be secured leading to a suitable appearance, and allowing variations in the values of physical properties to be small.

From such points of view, a fiber diameter of the non-woven fabric layer (B layer) of 0.7 µm or less is more desirable and particularly of 0.5 µm or less is even more desirable.

<Thermoplastic Resin (b)>

The non-woven fabric layer (B layer) is one containing a thermoplastic resin (b) as main constituent. In other words, the non-woven fabric layer (B layer) can be formed from a resin composition having thermoplastic resin (b) as main constituent.

It is desirable that the thermoplastic resin (b) serving as the main constituent of the non-woven fabric layer (B layer) is a thermoplastic resin having a peak value for the crystal melting temperature in a higher temperature region than the peak value for the crystal melting temperature of the above-mentioned thermoplastic resin (a). Among them, thermoplastic resins having a peak value for the crystal melting temperature in the region of 200° C. or higher, of which the region of 250° C. or higher, of which particularly the region of 300° C. or higher, are desirable.

As types of thermoplastic resin (b), one species or a mixed resin comprising a combination of two species or more among, for instance, polyfluorinated vinylidene, polyacrylonitrile, aramide, polyimide, polyamide imide, polyacrylonitrile, polyarylate, cellulose, polyazomethine, polyacetylene, polypyrrole and the like, are desirable. Among them, from the point of view of heat resistance, aramide and polyimide are particularly desirable.

Note that an additive generally mixed with a resin composition, for instance, an oxidation inhibitor, an ultraviolet light absorbent and the like, may be mixed with the non-woven fabric layer (B layer), in other words resin composition serving as a raw material for forming non-woven fabric layer (B layer).

<Air Permeability>

It is desirable that the air permeability of the non-woven fabric layer (B layer) is less than 100 sec/100 ml, particularly less than 50 sec/100 ml, of which particularly less than 15 sec/100 m. If less than 100 sec/100 ml, since air permeability can be secured by securing continuity to some extent (that is to say, since air permeability can be numerically small), for instance when the use is as a battery separator, the electric resistance can be low, which is more suitable for a use as a separator.

<Porosity>

It is desirable that the porosity of the non-woven fabric layer (B layer) is 50% or greater, particularly 70% or greater, of which particularly 80% or greater. If 50% or greater, since air permeability can be secured by securing continuity to some extent (that is to say, since air permeability can be numerically small), for instance when the use is as a battery separator, the electric resistance can be low, which is more suitable for use as a separator. On the other hand, while there are no particular limitations with regard to the upper limit, 98% or less is desirable and more desirable is 95% or less. If porosity is 98% or less, since strength can be secured to some extent at the same time as, for instance when the use is as a battery separator, the shutdown function can be secured, a suitable use as a separator is possible.

[Layer Constitution of the Laminated Porous Film]

Regarding the layer constitution of the present laminated porous film, there are no particular limitations as long as (A layer) and (B layer) serving as the fundamental constitution are present. In addition, the (A layer) and (B layer) can be single layers or layered as long as they are provided with the functions demanded of each layer.

As layer constitution, the simplest constitution is (A layer)/(B layer) with 2 layers from 2 species. In case of a 2 species, 3 layers constitution, there are (A layer)/(B layer)/(A layer) and (B layer)/(A layer)/(B layer), and preferably, it is desirable that the non-woven fabric layer (B layer) is the outer layer from the point of view of production. However, it does not matter which layer constitution as long as each layer fulfills the functions thereof and does not impact other properties. Furthermore, as far as the number of layers, it may be increased to 4 layers, 5 layers, 6 layers, 7 layers and the like, as necessary.

In addition, from the point of view of improving the adhesiveness thereof, a constitution may be such that an adhesive layer is present. For instance, constitutions such as (A layer)/adhesive layer/(B layer) and (B layer)/adhesive layer/(A layer)/adhesive layer/(B layer) can be cited.

[Thickness]

A thickness for the entirety of the present laminated porous film of 1 µm or greater is desirable, more preferably 12 µm or greater and even more preferably 15 µm or greater. In addition, as the upper limit, 100 µm or less is desirable, more preferably 80 µm or less and even more preferably 50 µm or less. In particular, when the use is as a battery separator, 11 µm to 50 µm is desirable. At 11 µm or greater, sufficient SD property can be conferred, and in addition, at 50 µm or less, the energy density of the battery can be improved.

In regard to the thickness of each layer, it is desirable that the thickness of the porous membrane layer (A layer) is 10 µm or greater. If the thickness of the porous membrane layer (A layer) is less than 10 µm, it is not desirable, since the handing ability thereof drops extremely, and in addition, the strength also decreases. In addition, when the use is as a battery separator, exerting SD property sufficiently becomes difficult. The reason is, considering that the SD property is a property in which the pores of a porous membrane are occluded by fluidization of the resin due to the heat, at less than 10 µm, the absolute amount of resin is thought to be insufficient, which does not allow the SD property to be exerted sufficiently. From this point of view, when the present laminated porous film is to be used as a battery separator, it is important that the thickness of the porous membrane layer (A layer) is 10 µm or greater, preferably 12 µm or greater and more preferably 15 µm or greater. In addition, as the upper limit, it is desirable that the thickness of the porous membrane layer (A layer) is less than 50 µm, particularly less than 40 µm, of which particularly less than 30 µm is desirable. If the thickness of the porous membrane layer (A layer) is less than 50 µm, the thickness for the entirety of the porous film can be also small, allowing the energy density of the battery to be improved.

Meanwhile, it is desirable that the thickness of the non-woven fabric layer (B layer) (if two layers or more of B layer are included, the thickness of each B layer) is 10 µm or less and more preferably 7 µm or less. When the present laminated porous film is to be used as a battery separator, the non-woven fabric layer (B layer) only needs to contribute in the improvement of the BD property in particular, if the thickness of the non-woven fabric layer (B layer) is small, the thickness of the entirety of the present laminated porous film can be small, allowing the energy density of the battery to be increased. On the other hand, as the lower limit of the thickness, without limitations as long as the BD property is expressed, 1 µm or greater is desirable, and 3 µm or greater is more desirable. A thickness for the non-woven fabric layer (B layer) of 1 µm or greater allows the BD property to be improved even more.

[Producing Method]

In the following, an example of producing method for the present laminated porous film will be described. However, producing method for the present laminated porous film is not limited to the producing method described in the following.

Here, a producing method will be described for the present laminated porous film comprising 2 species and 2 layers, a porous membrane layer (A layer) and a non-woven fabric layer (B layer), which is the simplest.

In this case, as a method for layering a porous membrane layer (A layer) and a non-woven fabric layer (B layer), in addition to methods in which the film constituting each layer is laminated or adhered with an adhesive or the like, methods for directly forming and layering a non-woven fabric layer (B) over a porous membrane layer (A layer), and the like, may be used. Among these, from the point of view simplicity and productivity of production process and the like, methods for directly forming and layering a non-woven fabric layer (B) over a porous membrane layer (A layer) are desirable. Thus, a method for directly forming and layering the non-woven fabric layer (B) over the porous membrane layer (A layer) will be described below.

<Porous Membrane Layer (A Layer) Producing Method>

The morphology of the film for forming the porous membrane layer (A layer), that is to say, of the film prior to forming the porous membrane layer (A layer), may be either planar or tubular. However, planar is more desirable from the points of productivity (for instance, the property of allowing a plurality of the product to be taken in the width direction of the raw sheet) and allowing for processing on the internal surface, such as coating.

As a planar film producing method, the method whereby a raw material resin is melted and extruded through a T-die, for instance using an extruder, cooled and solidified with a casting roll, roll drawn longitudinally, tenter drawn transversally, and then subjected to annealing, cooling and the like, to produce a film drawn in two axial directions, can be indicated as example. In addition, a method whereby a film produced by the tubular method is cut open to prepare a planar film can be also adopted.

Here, as methods for producing a film for forming a porous membrane layer (A layer), that is to say, a film provided with a porous structure, for instance (i) the wet process whereby a resin and a plasticizer such as liquid paraffin and the like are mixed and melted to be turned into a raw sheet, the raw sheet is immersed in a solvent to extract the plasticizer from within the film and then drawn, or, the raw sheet is drawn and then immersed in a solvent to extract the plasticizer, (ii) the dry process whereby the film is given a large deformation at preparing of membrane (high draft rate) to form a crystalline portion within the film, this is drawn in multiple-steps at low temperature to high temperature to generate interface separation between the crystalline portion and the non-crystalline portion, creating a porous membrane, (iii) the filler method whereby a mixture of filler and resin is melted to be turned into a raw sheet and then drawn to generate interface separation between the filler and the resin, creating a porous membrane, and other methods can be cited, and any may be used to produce a film provided with a porous structure.

Among these, from the point that it uses organic solvent in large amounts, and the like, (i) the wet process is not effective, and in addition, it is not desirable environmentally. Since it is difficult to keep the stability of formability at preparing of membrane, and also on the point that productivity is poor due to the porous structure being expressed by carrying out drawing in multiple steps with extremely subtle controls, (ii) the dry process does not qualify as being desirable. In contrast, (iii) the filler method is desirable on the point that a porous membrane can be obtained more effectively than other methods, since not only the use of a large amount of organic solvent is not required, but also preparing and drawing of the raw sheet can be carried out simply. Thus, from an environmental point of view, a production efficiency point of view and the like, it is desirable to adopt the filler method, or, a method combining as necessary the filler method and solvent extraction (regarding solvent extraction, refer to methods described in Japanese Patent Publication No. 3050021).

Consequently, here, as a preferred example of porous membrane layer (A layer) producing method, a method will be described, whereby a resin composition in which a filler is mixed is extruded by the T-die extrusion method to prepare a raw sheet, and then the raw sheet is drawn to be turned into a porous membrane. However, the purpose is not to limit to this method.

First, a resin composition constituting the porous membrane layer (A layer) is prepared.

In this case, it suffices that raw materials such as thermoplastic resin, filler and plasticizer and the like are mixed preferably using a Henschel mixer, a super mixer, a tumbler type mixer, or the like, or all the compositions are introduced in a bag and mixed by hand-blending, then, pelletized by melt-kneading for instance with a uniaxial or a biaxial extruder or kneader, or the like. More desirably, using a biaxial extruder is adequate.

Next, the pellet raw material is melted, extruded from a T-die to be extrusion-formed into a film-shape, and cool-solidified with a casting roll.

In this case, it is adequate to determine the gap of the T-die to be used from the thickness of the film required ultimately, drawing condition, draft rate, various conditions and the like. As preferred indicators of T-die gap, 0.1 mm or greater is desirable, and particularly desirable is 0.5 mm or greater. An upper limit of 3.0 mm or less is desirable, and particularly desirable is 1.0 mm or less. It is desirable if within the aforementioned limits, on the aspects of production such as production speed and production stability.

It is desirable to adjust suitably the extrusion temperature in extrusion forming, according to the flow property, formability and the like, of the resin composition. As preferred indicators, 150° C. or higher is desirable, and 180° C. or higher is more desirable. In addition, regarding the upper limit, 300° C. or lower is desirable, and 280° C. or lower is more desirable. It is desirable if 150° C. or higher, since the viscosity of the molten resin becomes low enough and formability excellent. On the other hand, deterioration of the resin composition can be inhibited at 300° C. or lower, which is desirable.

It is desirable that the temperature of cooling by the casting roll is 120° C. or lower. This is because the extruded molten resin becomes less prone to troubles such as sticking to and winding around the casting roll, and can be efficiently turned into a sheet.

In the following, the raw film obtained as described above is drawn.

Regarding drawing methods, methods such as roll drawing method, rolling method, tenter drawing method and simultaneous biaxial drawing method exist, and it suffices to carry out uniaxial drawing or biaxial drawing with these alone or two or more in combination.

When carrying out biaxial drawing, it may be simultaneous biaxial drawing or it may be sequential biaxial drawing. However, sequential biaxial drawing is more desirable on the points that the drawing conditions can be selected in each drawing process and that controlling the porous structure is easier.

When carrying out sequential biaxial drawing, it is desirable that the drawing conditions (for instance drawing temperature and draw ratio) are suitably adjusted depending on the composition, crystal melting peak temperature, degree of crystallinity and the like, of the resin composition used. However, the desirable indicators are as described below.

For a longitudinal draw, a drawing temperature of 20° C. or higher is desirable, more preferably 40° C. or higher, and further preferably 60° C. or higher. In addition, as the upper limit, a range of 130° C. or lower is desirable, more preferably 120° C. or lower, and further preferably 110° C. or lower.

A longitudinal draw ratio of 2-fold or greater is desirable, 3-fold or greater is more desirable, and further preferable is 4-fold or greater. In addition, as the upper limit, 10-fold or less is desirable, more preferably 8-fold or less, and further preferably 7-fold or less.

Carrying out longitudinal drawing in the above-mentioned ranges allows an adequate degree of pore starting points to be expressed, while suppressing rupture at drawing.

For a transversal draw, a drawing temperature of 100° C. or higher is desirable, more preferably 110° C. or higher, and further preferably 120° C. or higher. In addition, as the upper limit, a range of 160° C. or lower is desirable, more preferably 150° C. or lower, and further preferably 140° C. or lower.

A transversal draw ratio of 2-fold or greater is desirable, 3-fold or greater is more desirable, and further preferably is 4-fold or greater. In addition, as the upper limit, 10-fold or less is desirable, more preferably 8-fold or less, and further preferably 7-fold or less.

Carrying out transversal drawing in the above-mentioned ranges allows the pore starting points formed by the longitudinal drawing to be enlarged to a suitable degree, allowing a microscopic porous structure to be expressed.

For the previous drawing process, a drawing speed of 500%/minute or greater is desirable, more preferably 1500%/minute, and further preferably 2500%/minute. On the other hand, as the upper limit, a value of 12000%/minute or less is desirable, more preferably 10000%/minute or less, and further preferably 8000%/minute or less.

Next, the biaxially drawn film obtained in this way is wound, after heat treatment (also referred to as heat fixing) is carried out at temperatures on the order of 130 to 170° C. and then uniformly cooling, with the purpose of improving dimensional stability or the like. During heat treatment processing, a 3 to 15% relaxation treatment may be performed, as necessary.

By such heat treatment, dimensional heat stability of the laminated porous film becomes all the more adequate.

Note that physical properties (for instance, thickness, air permeability, porosity and the like) of the porous membrane layer (A layer) can be adjusted by adjusting the type of resin, the type of filler, the type of plasticizer, the amounts and composition ratios thereof, and drawing conditions (draw ratio, drawing temperature and the like) to be used.

<Non-Woven Fabric Layer (B Layer) Preparation Method>

A method for preparing a non-woven fabric layer (B layer) using the electrospinning method will be described as one example of preferred producing method for the non-woven fabric layer (B layer).

As one example of method for preparing a non-woven fabric layer (B layer) using the electrospinning method, a method can be cited, comprising (1) the step of preparing a polymer solution by dissolving a thermoplastic resin (b) in a solvent and (2) the step of forming a non-woven fabric layer (B layer) above a porous membrane layer (A layer) set over a collection plate through spinning by the electrospinning method using the polymer solution prepared in the previous step (1).

Here, the electrospinning method is a method whereby, in a space where an electric field has been generated between electrodes, a polymer solution comprising a resin dissolved in a solvent is pulled out (spun) in the direction of a collection electrode to obtain a non-woven fabric. Using this method, a non-woven fabric, which is 1 μm or less in fiber diameter, can be obtained simply.

In the following, a non-woven fabric layer (B layer) producing method using the electrospinning method will be described in detail.

(Step (1))

To prepare a non-woven fabric layer (B layer) by the electrospinning method, it is desirable to prepare a polymer solution by dissolving a thermoplastic resin (b) in a solvent first.

As solvent required preparing this polymer solution, it is desirable that the solvent dissolves the thermoplastic resin (b) sufficiently and evaporates at the spinning stage in the electrospinning method, allowing a non-woven fabric to be formed directly over the collection electrode. From this point, it is desirable that the solvent is selected suitably from the point of view of solubility with respect to the thermoplastic resin (b) and handing ability.

As examples of solvents for dissolving thermoplastic resin (b), acetone, chloroform, ethanol, propanol, isopropanol, methanol, toluene, tetrahydrofuran, benzene, benzyl alcohol, 1,4-dioxane, carbon tetrachloride, cyclohexane, cyclohexanone, methylene chloride, phenol, pyridine, trichloroethane, formic acid, acetic acid, N,N-dimethyl formamide, dimethyl sulfoxide, ethylene carbonate, propylene carbonate, acetonitrile, butylene carbonate, butyrolactone, diethyl carbonate, diethyl ether, dimethoxy ethane, 1,3-dimethyl-2-imidazolidinone, dioxolane, ethyl methyl carbonate, methyl formate, 3-methyl oxazolidine-2-one, methyl propionate, methyl tetrahydrofuran, sulfolane, N-methyl-2-pyrrolidone, dimethyl formamide, dimethyl acetamide and such may be used.

These solvent may be used alone, in addition, may be used as a mixed solvent combining a plurality of solvents. In particular, in the electrospinning method, since solution viscosity and solvent evaporation speed exert a large influence on the average fiber diameter of the formed spun thread, the fiber diameter can be controlled by adjusting the solution viscosity and solvent evaporation speed of the solvent.

It is desirable that the resin concentration of thermoplastic resin (b) in the polymer solution is 0.05 to 20 percent in mass. If the concentration is less than 0.05 percent in mass, due to the concentration being too low, spinning becomes difficult and forming a non-woven fabric becomes difficult. In addition, if greater than 20 percent in mass, sometimes the average diameter of the obtained fiber becomes too large, or the viscosity becomes high, and electrospinning becomes difficult. The concentration is preferably 0.1 to 15 percent in mass, and more preferably 0.5 to 10 percent in mass.

Arbitrary methods can be adopted to draw out a polymer solution obtained in this way into an electric field. As one example, it suffices to supply the polymer solution to the nozzle, generate an electric field between this nozzle and a collection electrode, causing the electric field to draw the polymer solution out from this nozzle to be turned into a spun thread. In so doing, it is desirable that the diameter of the nozzle is on the order of 0.1 to 2 mm. In addition, the nozzle may be metal-made or non-metal-made. In case of metal, the nozzle can be used as one of the electrodes.

As a method for generating an electric field between the electrodes, for instance, it suffices to ground the electrode on one hand (collection electrode) and apply a high voltage between this and one or more electrodes on the other hand. As an indication of the voltage to be applied, 0.2 to 5 kV/cm per inter-electrode distance is desirable. Suitably spinning is possible by carrying it out within the above ranges.

It is desirable that the solution temperature when spinning is within a temperature range of 0° C. to the boiling point of the solvent, and spinning is also possible readily at room temperature.

The relative humidity when spinning is not limited in particular, and for instance, 10 to 70% allows electrospinning A relative humidity of 20 to 60% is more desirable, of which, in particular, a relative humidity of 30% or less is desirable.

The density and thickness of the obtained non-woven fabric can be controlled by controlling the spitting time when spinning (Step (2))

When a porous membrane layer (A layer) is set over a collection plate and the polymer solution obtained in Step (1) is spun toward the collection plate, the solvent evaporates, forming a fibrous substance. In so doing, at the point of time when the substance has been collected by the porous membrane layer (A layer) over this collection plate, a non-woven fabric having a fiber diameter of at least 1 μm or less is formed.

At ordinary room temperature (around 20° C.), the solvent evaporates completely before the substance is collected at the porous membrane layer (A layer); however, if solvent evaporation is insufficient, spinning can be carried out under reduced pressure condition.

Although the temperature for spinning depends on the solvent evaporation behavior and the viscosity of that solution, in general, 0° C. or higher is desirable, more preferably 5° C. or higher, and further preferably 10° C. or higher. On the other hand, as the upper limit, 80° C. or lower is desirable, more preferably 70° C. or lower, and further preferably 50° C. or lower.

Adjusting the inter-electrode distance, charge amount, electric field intensity, nozzle size, amount of solution sprayed out from the nozzle, solution concentration, ambient temperature, ambient humidity and the like when spinning in this way, allows the thickness and the basis weight of the non-woven fabric layer (B layer) to be controlled.

Note that by placing the polymer solution obtained in Step (1) in a bath and setting therein a roll serving as an electrode, and carrying out the rest similarly to the method described above, a non-woven fabric can be also obtained similarly to above. The merit of this method resides on the point that, since spinning does not depend on a nozzle, a non-woven fabric having a large width can be prepared effectively.

As shown above, the non-woven fabric prepared by the electrospinning method can have a considerably compact structure, compared to non-woven fabrics prepared by dry and wet processes of the conventional art. Therefore, for instance, a filler is mixed in the middle layer, while the filler sometimes falls off with a non-woven fabrics prepared by dry and wet processes of the conventional art, using the non-woven fabric prepared by the electrolytic spinning method, the filler is prevented from falling off, due to the compact structure thereof. From this point of view, adapting the electrospinning method is also advantageous.

Note that when forming (B layer) directly on (A layer), if the extent of stability between both parties is insufficient, as necessary, a layer may be intercalated between (A layer) and (B layer) to support adhesion. In addition, pretreatments such as corona treatment and hydrophilization treatment may be performed beforehand on the (A layer).

Furthermore in addition, from the points of view of improvement of adhesiveness and improvement of flatness, it is also possible to carry out roll pressing or the like. For instance, by pressure bonding in a heated state between a pair of flat plates or between metal rolls, a laminated porous film having better flatness can be constituted. As roll pressing conditions, for example, when using a metal roll, although a linear pressure in the range of 30 to 400 kg/cm can be given as example, there is no problem heating within a range that does not influence the porous structure and in particular air permeability. The roll pressing may be carried out several times as long as the porous structure is not lost.

[Physical Properties of the Laminated Porous Film]

In the following, various physical properties of the present laminated porous film will be described.

<Air Permeability>

Air permeability represents the difficulty for air to pass through in the direction of the film thickness and can be expressed by the number of seconds needed for 100 ml of air to pass through the laminated porous film. Therefore, a smaller numerical value of air permeability means a better air passage, and a larger numerical value of air permeability means a more difficult air passage. That is to say, if this numerical value is smaller, a better continuity in the direction of the film thickness direction is meant, and if this numerical value is larger, a worse continuity in the direction of the film thickness direction is meant. Continuity represents the extent of continuity of the pores in the direction of the film thickness.

If the air permeability of the present laminated porous film is low, the present laminated porous film can be used in various applications. For instance, when used as a separator for lithium ion secondary battery, a low air permeability means easy movement of lithium ions, and battery performance is excellent, therefore desirable.

From such a point of view, it is desirable that the air permeability (AP2) of the present laminated porous film is 10 sec to 10000 sec/100 ml. More desirable is 10 to 3000 sec/100 ml, and further preferably 10 to 1000 sec/100 ml; among these, particularly desirable is 90 sec/100 ml or greater.

If air permeability is 10 sec/100 ml or greater, it can be evaluated that micropores are formed uniformly in the film. On the other hand, if 10000 sec/100 ml or less, it indicates that continuity is good and aeration property is excellent. When using as a battery separator, it is desirable that air permeability thereof is 10 to 1000 sec/100 ml.

<SD Property>

When the present laminated porous film is to be used as a battery separator, it is desirable that the present laminated porous film expresses SD property at 100° C. or higher. In other words, it is desirable that the micropores are obstructed at 100° C. or higher, more preferably at 110° C. or higher, and it is desirable that the micropores are obstructed further preferably at 120° C. or higher. In this case, as the upper limit temperature for expressing SD property, 150° C. or lower is desirable, more preferably 145° C. or lower, and further preferably 140° C. or lower. If the temperature for expressing SD property is 100° C. or higher, it is desirable on the point that, for instance, when a battery in which the present laminated porous film is used as a separator is left inside an automobile in the summer, since up to nearly 100° C. can be reached depending on the location, a decline in function as a battery can be avoided even in such a situation. On the other hand, if 150° C. or lower, safety as a battery can be secured.

Note that, as a method for assessing the presence or the absence of expression of SD property, the method of carrying out heating at a specific temperature and examining the value (AP1/AP2), which is the ratio between air permeability 3 minutes after carrying out heating (AP1) and air permeability prior to heating (AP2) can be cited, and in so doing, when the value of AP1/AP2 is 10 or greater, it can be assumed that the SD property has been expressed. Regarding the value of AP1/AP2, 20 or greater is desirable, 30 or greater is more desirable, and among these, 100 or greater is particularly desirable. When AP1/AP2 is 10 or greater, it indicates that the value of AP1 is large, that is to say, the micropores are obstructed and continuity has worsened, and it can be assumed that SD property is expressed sufficiently.

In addition, when the present laminated porous film is to be used as a battery separator, it is desirable to maintain the SD property up to a high temperature at or higher than the temperature at which the SD property expressed, for instance, on the order of up to 200° C. Since by maintaining the SD property at the temperature at which the SD property has been expressed or higher, the positive and the negative electrodes can be isolated to prevent direct contact between the positive and the negative electrodes even if the temperature inside the battery rises, it is effective from the aspect of safety of the battery. Therefore, in the entire heating temperature range of 150 to 200° C., it is important that AP1/AP2 is 10 or greater, and in particular 20 or greater, of which in particular 30 or greater is desirable.

In order for the present laminated porous film to obtain such an SD property as described above, regarding the composition, it is desirable to use as the thermoplastic resin (a) to be the main constituent of the porous membrane layer (A layer), resins having a peak value of crystal melting temperature in the temperature range of 100 to 150° C., in particular resins having the peak value in a temperature range of 100 to 145° C., and among these, in particular resins having the peak value in a temperature range of 100 to 140° C., as described above.

In addition, regarding the structure, it is desirable that the maximum pore diameter of the porous membrane layer (A layer) is small. As the upper limit, 1 µm or less is desirable, and 0.5 µm or less is more desirable.

Then, in addition, in order to obtain such an SD property as described above, it is desirable that the porous membrane layer (A layer) is drawn.

<BD Property>

When the present laminated porous film is to be used as a battery separator, it is desirable to provide BD property in addition to the above SD property. That is to say, it is desirable to provide heat resistance that may maintain the shape of the separator up to a high temperature at or higher than the temperature at which SD property is expressed, for instance, up to 150° C. or higher and preferably 200° C. or higher. If the shape of the separator can be maintained up to 200° C. or higher (for instance, 220° C.), it is effective from the aspect of safety of the battery since the positive and the negative electrodes can be isolated to prevent direct contact between the positive and the negative electrodes even if the temperature inside the battery rises.

Thus, when the present laminated porous film is to be used as a battery separator, having excellent SD property and BD property combined can contribute all the more to the safety of the battery.

Concretely, it is desirable that the present laminated porous film is provided with heat resistance (that is to say, BD property) allowing the shape as a separator to be maintained at 200° C. or higher, for instance, 220° C. If the shape as a separator can be maintained at 200° C. or higher, for instance, 220° C., a battery for which safety has been secured sufficiently can be provided.

Furthermore, it is more desirable that heat resistance (that is to say, BD property) allowing the shape as a separator to be maintained at 250° C. or higher, for instance, 250° C., is provided.

In order for the present laminated porous film to obtain such a BD property as described above, regarding the composition, it is desirable to use as thermoplastic resin (b) to be the main constituent of the non-woven fabric layer (B layer), thermoplastic resins having the peak value of crystal melting temperature in a higher temperature region than the peak value of the crystal melting temperature of the thermoplastic resin (a) to be the main constituent of the porous membrane layer (A layer), as described above, among which, using thermoplastic resins with a peak value of the crystal melting temperature in a region of 200° C. or higher, of which a region of 250° C. or higher, of which in particular a region of 300° C. or higher, is desirable.

In addition, in order to obtain such a BD property as described above, it is desirable to form the non-woven fabric layer (B layer) by the electrospinning method to reduce the fiber diameter of the B layer at the same time as thinning the thickness of the B layer.

<Porosity>

The porosity of the present laminated porous film is preferably 5 to 80%, and further preferably 20 to 70%. If porosity is 5% or greater, the porous film has continuity, and in addition, if 80% or less, a notable decrease in the mechanical strength of the porous film can be suppressed.

Note that porosity is a value that can be computed by measuring the substantial amount of film $W_1$, calculating the mass $W_0$ when porosity is 0% from the density and the thickness of the resin composition, from these values and based on the following equation.

$$\text{Porosity } Pv(\%) = \{(W_0 - W_1)/W_0\} \times 100 \quad [1]$$

[Explanation of the Terms]

In the present invention, "non-woven fabric" indicates a fibrous structure fabricated by adhering or entangling, or both, between the fibers mechanically, chemically or with a solvent, or a combination thereof.

"Other than a non-woven fabric" indicates a porous body fabricated by methods other than for non-woven fabric. Concretely, it indicates a porous film comprising the sheet rendered porous by carrying out drawing or the like, or a sheet comprising a foamed body or the like, which has used physical foaming, chemical foaming and the like.

"Porous membrane" indicates a porous film comprising the sheet rendered porous by carrying out drawing or the like, or a sheet comprising a foamed body or the like, which has used physical foaming, chemical foaming and the like.

In general, "film" refers to a thin and flat product having an extremely small thickness compared to length and width, with the maximum thickness arbitrarily limited, and commonly supplied in the form of a roll (Japanese industry specification JISK6900); in general, "sheet" refers to a flat product, which is thin as defined in JIS, generally having a small thickness in view of the length and the width. However, the boundary between a sheet and a film is not defined, and since there is no need to distinguish the two literally in the present invention, in the present invention, "sheet" is included when referring to "film", and "film" is included when referring to "sheet".

In addition, in the present invention, when the expression "main constituent" is used, unless mentioned explicitly, it includes the meaning of allowing other constituents to be included to the extent that the function of the main constituent is not impaired; without specifying the content ratio of the main constituent in particular, it includes the meaning that the main constituent (if two constituents or more are the main constituents, the total amount thereof) amounts to 50 percent in mass or greater, preferably 70 percent in mass or greater, and particularly preferably 80 percent in mass or greater (contains 100 percent in mass).

In addition, when "X to Y" (X and Y are arbitrary numbers) is stated, unless explicitly indicated, "X or greater but Y or less" is meant, including the meaning of intending "greater than X but smaller than Y is desirable".

Furthermore in addition, when "X or greater" (X is an arbitrary number) or "Y or less" (Y is an arbitrary number) is stated, it includes the meaning of intending "greater than X is desirable" or "smaller than Y is desirable".

EXAMPLES

In the following, Examples and Comparative Examples will be shown to describe the laminated porous film of the present invention in further detail; however, the present invention is not limited to these.

Note that the measurement and evaluations shown in the Examples and Comparative Examples were carried out as follows. Note that the feed (flow) direction of the laminated porous film is described as the "longitudinal" direction and the direction perpendicular thereto as the "transversal" direction.

(1) Fiber Diameter

With a scanning electron microscope (S-4500, manufactured by Hitachi, Ltd.), 30 points were randomly observed in the non-woven fabric layer (B layer) to measure each fiber diameter, among which the maximum fiber diameter was indicated as the fiber diameter of the non-woven fabric layer (B layer).

(2) Thickness of the Entire Laminated Porous Film

With a 1/1000 mm dial gauge, the thickness was measured non-specifically at 30 locations within the film plane, the mean value of which was indicated as the total thickness.

(3) Thickness of the Porous Membrane Layer (A Layer)

A cross section of laminated porous film was cut, thickness of the porous membrane layer (A layer) was measured by a 30 point observation with a scanning electron microscope (S-4500, manufactured by Hitachi, Ltd.), the mean value of which was indicated as the thickness of the A layer.

(4) Air Permeability (Gurley Value)

The air permeability (sec/100 ml) was measured according to JIS P8117 (ISO 5636/5).

(5) SD Property

A film in wound state was cut-out into 80 mm square, and the air permeability of the cut-out film (AP2) was measured.

Next, the cut-out film was sandwiched between aluminum plates with a 40 mm Ø hole open in the center, the surrounding was secured with clips, the film sample was introduced in an oven (capacity: 216 L, electric power: 2.7 kW, under air atmosphere) set to a predetermined heating temperature, heated, taken out after 3 minutes, and the air permeability (AP1) thereof was measured.

When the value of AP1/AP2 was 10 or greater compared with air permeability (AP2) prior to heating, it was assumed that SD property was expressed and the evaluation was "○ (circle)", if less than 10, it was assumed that this property was not expressed and the evaluation was "x (cross)".

For the oven, Tabai Gear Oven GPH200 manufactured by Tabai Espec was used.

(6) BD Property

A film in wound state was cut-out into 80 mm square, the cut-out film was sandwiched between a Teflon membrane and an aluminum plate with a hole open in the center, and the surrounding was secured with clips. The sample was introduced in an oven (capacity: 216 L, electric power: 2.7 kW, under air atmosphere) set to a heating temperature of 220° C., taken out 3 minutes after the setting temperature was reached again, the state of the film was observed to assess the shape maintenance capability.

When the shape of the film was maintained, the evaluation was "○ (circle)" and when the membrane was disrupted without being able to maintain the shape, the evaluation was "x (cross)".

For the oven, Tabai Gear Oven GPH200 manufactured by Tabai Espec was used.

(7) Uniformity (Apparent Unevenness)

The presence/absence of white shade was observed visually for the laminated porous films (samples) obtained in Example and Comparative Example.

When the laminated porous film did not have shades and was uniform, the evaluation was "○ (circle)", if it had shades and was heterogeneous, the evaluation was "x (cross)".

EXAMPLES AND COMPARATIVE EXAMPLES

In the following, producing methods in the Examples and Comparative Examples will be described.

<Porous Membrane Layer (A Layer) Raw Materials>

The raw materials used were as follows.

PE-1: high density polyethylene ("7000FP" manufactured by Prime Polymers Co., Ltd.; MFR: 0.04 g/10 minute; crystal melting peak temperature: 132° C.)

PE-2: high density polyethylene ("Novatec HD HY530" manufactured by Japan Polyethylene Corporation; MFR: 0.55 g/10 minutes; crystal melting peak temperature: 134° C.)
PE-3: linear low density polyethylene ("Novatec LL FW20G" manufactured by Japan Polyethylene Corporation; MFR: 1.0 g/10 minutes; crystal melting peak temperature: 124° C.
PE-4: low density polyethylene ("Novatec LD LF441" manufactured by Japan Polyethylene Corporation; MFR: 2.0 g/10 minutes; crystal melting peak temperature: 113° C.)
PE-5: high density polyethylene ("2200J" manufactured by Prime Polymers Co., Ltd.; MFR: 5.2 g/10 minutes; crystal melting peak temperature: 131° C.)
PE-6: ultra high molecular weight polyethylene ("GHR8110" manufactured by Ticona; viscosity average molecular weight: 500,000; crystal melting peak temperature: 133° C.)
PE-7: ultra high molecular weight polyethylene ("HI-ZEX 145M" manufactured by Mitsui Chemicals, Inc., viscosity average molecular weight: 1,000,000; crystal melting peak temperature: 135° C.)
PP-1: homo polypropylene ("F300SV" manufactured by Prime Polymers Co., Ltd.; MFR: 3.0 g/10 minutes; crystal melting peak temperature: 163° C.)
FL-1: barium sulfate ("B-55" manufactured by Sakai Chemical Industry Co., Ltd.; average particle size: 0.6 μm)
FL-2: barium sulfate ("B-54" manufactured by Sakai Chemical Industry Co., Ltd.; average particle size: 1.2 μm)
FL-3: calcium carbonate ("NS#1000" manufactured by Nitto Funka Kogyo K. K.; average particle size: 1.2 μm)
PL-1: 12-hydroxy octadecanoic acid ("HCOP" manufactured by Hokoku Corporation; melting point: 85° C.)
PL-2: dipentaerythritol hexaoctanoate ("D-600" manufactured by Mitsubishi Chemical Corporation; melting point: −39° C.)
PL-3: paraffin wax ("130" manufactured by Nippon Seiro Co., Ltd.; melting point: 58° C.)<

<Porous Membrane Layer (A Layer) Producing Method>

Regarding I-1 to I-4, the compositions comprising the raw materials shown in Table 1 were mixed with a mixer, then melt-kneaded using a 40 mm Ø uniaxial extruder, extruded using an inflation die with a 1 mm lip gap at 200° C. and an extrusion speed of 20 kg/h, cooled and solidified with an air ring to create a raw sheet. Next, a porous membrane was prepared by roll drawing longitudinally under the conditions shown in Table 1 and then tenter drawing in the transversal direction under the conditions shown in Table 1.

Detailed conditions and various physical properties for the porous membrane layer (A layer) are shown in Table 1.

Regarding 1-5, after mixing with a proportion in mass of PE-3/PE-4/FL-3/PL-2=27/4/5/64 using a mixer, a biaxial extruder was used to melt-knead, and this was inflation formed to prepare a raw sheet. Next, a porous membrane was prepared by roll drawing longitudinally under the conditions shown in Table 1 and then tenter drawing in the transversal direction under the conditions shown in Table 1.

Detailed conditions and various physical properties for the porous membrane layer (A layer) are shown in Table 1.

Regarding 1-6, the resins shown in Table 2 were each melt-kneaded using separate biaxial extruders, 2 species, 3 layers layered raw sheet of PP-1/PE-5/PP-1 was prepared by co-extrusion using a 4 mm lip gap T-die at an extrusion temperature of 190° C. and extrusion speed of 10 kg/h. Note that the layer thickness ratio was PP-1/PE-5/PP-1=1/1/1.

Next, this 2 species, 3 layers layered raw sheet was heat processed by leaving it in a hot air circulating oven heated at 120° C. Then, the heat processed layered raw sheet was longitudinally drawn (low temperature drawing) 1.7 times at 25° C. with a roll drawing machine, and then longitudinally drawn (high temperature drawing) further 2.0 times at 100° C. to prepare a porous membrane.

Detailed conditions and various physical properties for the porous membrane layer (A layer) are shown in Table 2.

Regarding 1-7, after mixing a mixture comprising a proportion in mass of PE-6/PE-7/PL-3=8/16/76 using a mixer, a 40 mm Ø biaxial extruder was used to melt-knead, a T-die with a 2 mm lip gap was used to extrude at 170° C. with an extrusion speed of 10 kg/h, and a raw sheet was prepared by inflation forming.

Next, the obtained raw sheet was roll drawn longitudinally 2.5 times at 40° C., then, transversally tenter drawn 6 times at a temperature of 110° C., the obtained film was immersed in isopropanol at 65° C. to extract and remove paraffin wax from within the film, thereby forming holes within the film internal. Then, after being heat processed (heat fixation) at a temperature of 115° C. using a roll drawing machine, the obtained film was cooled. The roll speed ratio was adjusted so that the longitudinal draw ratio was 1.2 times during heat fixation to prepare a porous membrane.

Detailed conditions and various physical properties for the porous membrane layer (A layer) are shown in Table 1.

TABLE 1

| | A layer composition | | | Longitudinal Draw | | Transversal Draw | | A layer membrane thickness | A layer air permeability | A layer porosity |
|---|---|---|---|---|---|---|---|---|---|---|
| Type | Resin | Filler | Plasticizer | Ratio (times) | Temperature (° C.) | Ratio (times) | Temperature (° C.) | μm | Seconds/100 ml | % |
| I-1 (bottom: mass ratio) | PE-1 47.5 | FL-1 50.0 | PL-1 2.5 | 4.0 | 70 | 3.0 | 128 | 20 | 74 | 61 |
| I-2 (bottom: mass ratio) | PE-1 47.5 | FL-1 50.0 | PL-1 2.5 | 4.0 | 70 | 3.0 | 125 | 8 | 31 | 55 |
| I-3 (bottom: mass ratio) | PE-2 47.5 | FL-1 50.0 | PL-1 2.5 | 3.0 | 60 | 3.5 | 120 | 18 | 59 | 57 |
| I-4 (bottom: mass ratio) | PE-1 47.5 | FL-2 50.0 | PL-1 2.5 | 4.0 | 80 | 5.0 | 125 | 12 | 48 | 65 |
| I-5 (bottom: mass ratio) | PE-3 + PE-4 | FL-3 64.0 | PL-2 5.0 | 3.0 | 50 | — | — | 65 | 120 | 54 |

TABLE 1-continued

| | A layer composition | | | Longitudinal Draw | | Transversal Draw | | A layer membrane thickness | A layer air permeability | A layer porosity |
|---|---|---|---|---|---|---|---|---|---|---|
| Type | Resin | Filler | Plasticizer | Ratio (times) | Temperature (° C.) | Ratio (times) | Temperature (° C.) | μm | Seconds/100 ml | % |
| I-7 (bottom: mass ratio) | PE-6 + PE-7 8.0/16.0 | | PL-3 76.0 | 2.5 | 40 | 6.0 | 110 | 25 | 398 | 41 |

TABLE 2

| | A layer composition | | | Longitudinal Draw (low temperature drawing) | | Transversal Draw (high temperature drawing) | | A layer membrane thickness | A layer air permeability | A layer porosity |
|---|---|---|---|---|---|---|---|---|---|---|
| Type | Resin | Filler | Plasticizer | Ratio (times) | Temperature (° C.) | Ratio (times) | Temperature (° C.) | μm | Seconds/100 ml | % |
| I-6 (bottom: mass ratio) | PP-1/PE-5/PP-1 100/100/100 | — — | | 1.7 | 25 | 2.0 | 100 | 20 | 452 | 42 |

<Preparation of Non-Woven Fabric Layer (B Layer) and Laminated Porous Film>

Polyamide 66 (UBE nylon 2026, manufactured by UBE Industries, Ltd.) was selected as resin for preparing a non-woven fabric layer (B layer) and formic acid was used as solvent to prepare a 10 percent in mass nylon solution II-1.

Similarly, a meta series aramide resin (Conex powder, manufactured by Teijin Limited.) was selected as resin for preparing a non-woven fabric layer (B layer) and 1-methyl-2-pyrrolidone was used as solvent to prepare a 10 percent in mass aramide solution 11-2.

Next, various porous membrane layers (A layer) described in Table 1 were set on collection electrodes, the B layer solutions (electrospinning solution) indicated in Table 3 were used to perform the electrospinning method under the conditions indicated in Table 3, and a non-woven fabric layer (B layer) was formed directly over a porous membrane layer (A layer) to prepare a laminated porous film.

In the electrospinning method, by supplying the above solutions to the nozzle (Manufactured by Terumo Corporation; nozzle diameter: 0.8 mm), an electric field was generated between this nozzle and the collection electrode, and spinning was carried out by drawing the solution out of this nozzle with the electric field.

In addition, the resin concentration in the solution was 10 percent in mass, the solution temperature when spinning was 23° C., the spinning temperature was 23° C., the inter-electrode distance was 20 cm, and the intensity of the electric field was 2 kV.

The physical properties of the respective laminated porous films are shown in Table 4

Regarding Comparative Examples 2 and 3, Polyamide 66 (UBE nylon 2026, manufactured by UBE Industries, Ltd.) and polyethylene terephthalate (Novapex U110, manufactured by Mitsubishi Chemical Corporation) were respectively selected as resins for preparing non-woven fabric layer (B layer). In addition, in order to obtain a non-woven fabric layer (B layer) with a fiber diameter larger than 1 μm, a nylon non-woven fabric and a PET non-woven fabric were prepared by the melt-blowing method. Then, in Comparative Example 3, two species of non-woven fabric were layered by heat fusion to obtain a laminated porous film.

Note regarding Comparative Example 3 that the thickness as-is being thick, comparison was not possible; therefore, roll press was carried out with a metal roll under conditions where the temperature was 120° C. and the linear pressure was 80 kgf/cm.

The physical properties of the respective laminated porous films are shown in Table 4.

TABLE 3

| Type | A layer | B layer | Voltage applied KV | Spinning time Minutes | Layer constitution | Total membrane thickness μm | Air permeability Seconds/100 ml | Fiber diameter μm |
|---|---|---|---|---|---|---|---|---|
| Example 1 | I-1 | II-1 | 12 | 10 | A/B | 22 | 103 | 0.5 |
| Example 2 | I-3 | II-1 | 12 | 20 | B/A/B | 22 | 75 | 0.5 |
| Example 3 | I-4 | II-1 | 12 | 10 | B/A/B | 14 | 62 | 0.5 |
| Example 4 | I-1 | II-2 | 30 | 10 | B/A/B | 23 | 94 | 0.4 |
| Example 5 | I-3 | II-2 | 30 | 20 | B/A/B | 24 | 96 | 0.4 |
| Example 6 | I-5 | II-2 | 30 | 10 | B/A/B | 70 | 135 | 0.4 |
| Example 7 | I-6 | II-2 | 30 | 20 | B/A/B | 26 | 484 | 0.4 |
| Example 8 | I-7 | II-2 | 30 | 20 | B/A/B | 31 | 427 | 0.4 |
| Comparative Example 1 | I-2 | II-1 | 12 | 20 | B/A/B | 12 | 45 | 0.5 |

TABLE 3-continued

| Type | A layer | B layer | Voltage applied KV | Spinning time Minutes | Layer constitution | Total membrane thickness μm | Air permeability Seconds/100 ml | Fiber diameter μm |
|---|---|---|---|---|---|---|---|---|
| Comparative Example 2 | I-1 | Nylon non-woven fabric; density: 10 g/m²; thickness: 100 μm | | | A/non-woven fabric | 110 | 80 | 2.5 |
| Comparative Example 3 | | PET non-woven fabric; density: 110 g/m²; thickness: 100 μm Nylon non-woven fabric; density: 10 g/m²; thickness: 80 μm | | | non-woven fabric/ non-woven fabric | 175 | 10 | 2.5 |
| Comparative Example 4 | I-1 | — | — | — | A | 20 | 74 | — |

TABLE 4

| | | SD property (top: AP1/AP2; bottom: presence or absence of SD property expression) | | | | | | | BD property 220° C. | Uniformity External Appearance |
|---|---|---|---|---|---|---|---|---|---|---|
| Type | AP2 Seconds/100 ml | 120° C. | 130° C. | 140° C. | 150° C. | 160° C. | 200° C. | Overall evaluation | | |
| Example 1 | 103 | 1.0 X | 2.0 X | 29.5 ○ | 481.3 ○ | ∞ ○ | ∞ ○ | ○ | ○ | ○ |
| Example 2 | 75 | 1.0 X | 2.7 X | 42.9 ○ | 707.0 ○ | ∞ ○ | ∞ ○ | ○ | ○ | ○ |
| Example 3 | 62 | 1.0 X | 2.5 X | 46.8 ○ | 751.7 ○ | ∞ ○ | ∞ ○ | ○ | ○ | ○ |
| Example 4 | 94 | 1.0 X | 1.9 X | 34.4 ○ | 578.7 ○ | ∞ ○ | ∞ ○ | ○ | ○ | ○ |
| Example 5 | 96 | 1.0 X | 2.1 X | 32.5 ○ | 611.6 ○ | ∞ ○ | ∞ ○ | ○ | ○ | ○ |
| Example 6 | 135 | 1.0 X | 3.4 X | 38.8 ○ | 477.2 ○ | ∞ ○ | ∞ ○ | ○ | ○ | ○ |
| Example 7 | 484 | 1.0 X | 3.7 X | 13.6 ○ | 134.5 ○ | ∞ ○ | ∞ ○ | ○ | ○ | ○ |
| Example 8 | 427 | 1.0 X | 3.5 X | 13.0 ○ | 134.2 ○ | ∞ ○ | ∞ ○ | ○ | ○ | ○ |
| Comparative Example 1 | 45 | 1.2 X | 4.4 X | 62.3 ○ | 1066.7 ○ | 0.2 X | 0.2 X | X | ○ | ○ |
| Comparative Example 2 | 80 | 1.1 X | 2.4 X | 37.9 ○ | 634.5 ○ | ∞ ○ | ∞ ○ | ○ | ○ | X |
| Comparative Example 3 | 10 | 1.0 X | 0.9 X | 1.0 X | 0.9 X | 0.9 X | 0.8 X | X | ○ | X |
| Comparative Example 4 | 74 | 1.0 X | 2.1 X | 30.5 ○ | 502.1 ○ | 0.3 X | 0.3 X | X | X | ○ |

Considering the results in Table 4, when the laminated porous film of Comparative Example 1, in which the thickness of the porous membrane layer (A layer) was less than 10 μm and AP1/AP2 at heating temperatures of 160° C. to 200° C. was less than 10 (in particular, less than 1), was compared to the laminated porous film of the Examples, in which the thickness of the porous membrane layer (A layer) was 10 μm or greater and AP1/AP2 at heating temperatures of 150° C. to 200° C. was 10 or greater (in particular, 100 or greater), it was revealed that retaining the SD property at 150 to 200° C. is difficult if the thickness of the porous membrane layer (A layer) is less than 10 μm and AP1/AP2 at heating temperature of 160° C. to 200° C. is less than 10 (in particular, less than 1).

In addition, regarding Comparative Example 2, in which the fiber diameter was greater than 1 μm and AP1/AP2 at heating temperatures of 160° C. to 200° C. was less than 10 (in particular, less than 1), the thickness of the non-woven fabric layer (B layer) was thick, and when visually assessed, also had problems in terms of external appearance due to large unevenness in the distribution of the fibers thereof. When the use as a battery separator is considered, the laminated porous film obtained in Comparative Example 2 cannot be used as a battery separator due to poor uniformity of physical properties.

Regarding Comparative Example 3, no SD property was expressed with constitutions in which PET non-woven fabric and nylon non-woven fabric were layered. Regarding Comparative Example 4, no BD property was expressed in a constitution comprising only a porous membrane layer (A layer).

In contrast, it was revealed that the laminated porous films obtained in Examples 1 to 8 all had a thickness of porous membrane layer (A layer) of 10 μm or greater and a fiber diameter of the non-woven fabric layer (B layer) of 1 μm or less, furthermore, satisfied the condition that AP1/AP2 at heating temperatures of 150° C. to 200° C. were all 10 or greater (in particular, 100 or greater), all expressed SD property at 140° C. and also maintained SD property at temperatures of 150° C. to 200° C., furthermore, were also provided with heat resistance allowing the shape to be maintained at high temperatures of 200° C. or higher (220° C.).

INDUSTRIAL APPLICABILITY

As the laminated porous film of the present invention has excellent SD property and BD property combined, and from the excellent properties thereof, it can be used particularly suitably as a battery separator.

The invention claimed is:

1. A laminated porous film, comprising:
   a porous membrane layer (A layer) having a thickness of 10 µm or greater; and
   a non-woven fabric layer (B layer) having a fiber diameter of 1 µm or less;
   wherein:
   a ratio (AP1/AP2) of an air permeability after heating (AP1) to an air permeability prior to heating (AP2), in a heat test in which the film is placed for three minutes in an oven heated to a temperature of from 150° C. to 200° C., is 10 or greater;
   the air permeability prior to heating (AP2) is from 10 to 10,000 sec/100 ml;
   the non-woven fabric layer (B layer) comprises a thermoplastic resin (b) as a main constituent; and
   the thermoplastic resin (b) comprises at least one member selected from the group consisting of polyfluorinated vinylidenes, polyacrylonitriles, aramides, polyimides, polyamide imides, polyacrylonitriles, polyacrylates, celluloses, polyazomethines, polyacetylenes, and polypyrroles.

2. The laminated porous film as recited in claim 1, wherein the porous membrane layer (A layer) comprises a thermoplastic resin (a) as a main constituent, and a filler.

3. The laminated porous film as recited in claim 1, wherein a thickness of the non-woven fabric layer (B layer) is 10 µm or less.

4. The laminated porous film as recited in claim 2, wherein the thermoplastic resin (a) has a peak crystal melting temperature of from 100° C. to 150° C.

5. The laminated porous film as recited in claim 2, wherein the thermoplastic resin (b) has a peak crystal melting temperature higher than a peak crystal melting temperature of the thermoplastic resin (a).

6. A laminated porous film, comprising:
   a porous membrane layer (A layer) having a thickness of 10 µm or greater; and
   a non-woven fabric layer (B layer) having a fiber diameter of 1 µm or less;
   wherein:
   a ratio (AP1/AP2) of an air permeability after heating (AP1) to an air permeability prior to heating (AP2), in a heat test in which the film is placed for three minutes in an oven heated to a temperature of from 150° C. to 200° C., is 10 or greater;
   the air permeability prior to heating (AP2) is from 10 to 10,000 sec/100 ml;
   the porous membrane layer (A layer) comprises a thermoplastic resin (a) as a main constituent, and a filler;
   a thickness of the non-woven fabric layer (B layer) is 10 µm or less;
   the non-woven fabric layer (B layer) comprises a thermoplastic resin (b) as a main constituent; and
   the thermoplastic resin (b) comprises at least one member selected from the group consisting of polyfluorinated vinylidenes, polyacrylonitriles, aramides, polyimides, polyamide imides, polyacrylonitriles, polyacrylates, celluloses, polyazomethines, polyacetylenes, and polypyrroles.

7. The laminated porous film as recited in claim 6, wherein the thermoplastic resin (a) has a peak crystal melting temperature of from 100° C. to 150° C.

8. The laminated porous film as recited in claim 6, wherein the thermoplastic resin (b) has a peak crystal melting temperature higher than a peak crystal melting temperature of the thermoplastic resin (a).

9. A laminated porous film, comprising:
   a porous membrane layer (A layer) having a thickness of 10 µm or greater; and
   a non-woven fabric layer (B layer) having a fiber diameter of 1 µm or less;
   wherein:
   a ratio (AP1/AP2) of an air permeability after heating (AP1) to an air permeability prior to heating (AP2), in a heat test in which the film is placed for three minutes in an oven heated to a temperature of from 150° C. to 200° C., is 10 or greater;
   the air permeability prior to heating (AP2) is from 10 to 10,000 sec/100 ml;
   the porous membrane layer (A layer) comprises a thermoplastic resin (a) as a main constituent, and a filler;
   a thickness of the non-woven fabric layer (B layer) is 10 µm or less;
   the thermoplastic resin (a) has a peak crystal melting temperature of from 100° C. to 150° C.;
   the non-woven fabric layer (B layer) comprises a thermoplastic resin (b) as a main constituent;
   the thermoplastic resin (b) has a peak crystal melting temperature higher than the peak crystal melting temperature of the thermoplastic resin (a); and
   the thermoplastic resin (b) comprises at least one member selected from the group consisting of polyfluorinated vinylidenes, polyacrylonitriles, aramides, polyimides, polyamide imides, polyacrylonitriles, polyacrylates, celluloses, polyazomethines, polyacetylenes, and polypyrroles.

10. The laminated porous film as recited in claim 1, wherein the non-woven fabric layer (B layer) is formed directly over the porous membrane layer (A layer) by a method, comprising:
    preparing a polymer solution by dissolving a resin composition, which is a raw material the non-woven fabric layer (B layer), in a solvent; and
    spinning a non-woven fabric from the polymer solution in the presence of high voltage.

11. A battery separator, comprising the laminated porous film as recited in claim 1.

12. The battery separator as recited in claim 11, wherein:
    the laminated porous film has a thickness of from 1 µm to 50 µm; and
    the air permeability prior to heating (AP2) is from 10 to 1,000 sec/100 ml.

13. A battery, comprising the battery separator as recited in claim 11.

14. A battery, comprising the battery separator as recited in claim 12.

15. The laminated porous film as recited in claim 1, wherein the porous membrane layer (A layer) is in contact, either directly or via an adhesive layer, with the non-woven fabric layer (B layer).

16. The laminated porous film as recited in claim 6, wherein the porous membrane layer (A layer) is in contact, either directly or via an adhesive layer, with the non-woven fabric layer (B layer).

17. The laminated porous film as recited in claim 9, wherein the porous membrane layer (A layer) is in contact, either directly or via an adhesive layer, with the non-woven fabric layer (B layer).

* * * * *